March 24, 1931.  C. C. FARMER  1,797,409
AIR STRAINER
Filed Aug. 27, 1926

INVENTOR
CLYDE C. FARMER
BY Wm. M. Cady
ATTORNEY

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

AIR STRAINER

Application filed August 27, 1926. Serial No. 131,923.

This invention relates to air or other fluid strainers for separating dirt and foreign matter from a current of air.

In order to separate dirt from a current of air or other fluid, it has been a common practice to interpose a flat or cupped section of wire mesh in the air flow, so that the dirt in the flow of air is separated out and collects on the wire mesh screen.

With the above arrangement, it may happen that the screen will become so clogged with dirt and foreign matter as to impede and even stop the flow of air, and in some cases such a stoppage of the flow of fluid may result in throwing mechanism controlled by said flow of fluid out of action or rendering same inoperative.

The principal object of my invention is to provide an air strainer construction which will not prevent the flow of air, in case the strainer should become clogged with dirt.

Figure 1:
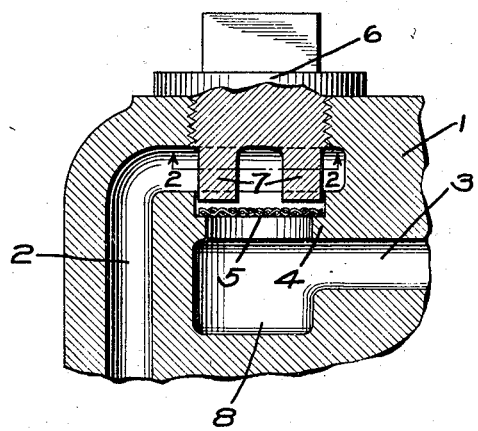
Figure 2:
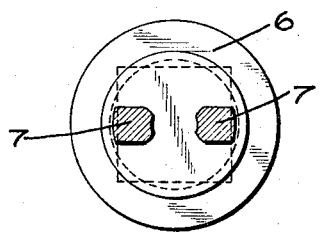
Figure 3:
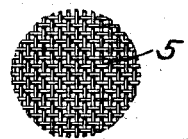

In the accompanying drawing; Fig. 1 is a section of a portion of a casting having air or fluid flow passages and showing my improved air strainer construction applied thereto; Fig. 2 a section of the strainer cap nut, on the line 2—2 of Fig. 1; and Fig. 3 a plan view of the strainer screen.

The reference numeral 1 indicates a portion of a casting having an air inlet passage 2 and an air outlet passage 3 and interposed between said passages is a chamber. At an intermediate point in the chamber, an annular shoulder 4 is provided and resting on said shoulder is a circular section 5 of wire mesh which forms the air strainer.

The casting 1 is provided with a threaded opening above the section 5, through which the section 5 may be applied or removed, and a threaded cap nut 6 is screwed into the opening. Said cap nut may be provided with depending lugs 7 which tend to prevent displacement of the wire mesh, but which provide a certain amount of clearance space above the wire mesh, so as to permit same to act in accordance with my invention.

It will be evident that the wire mesh section 5 operates to separate dirt from a current of air flowing from passage 2, through the intermediate chamber, to the outlet passage 3. If, however, the screen wire should become so clogged with dirt as to substantially interfere with the flow of air, the pressure of air acting above the screen will of course be greater than the pressure of air below the screen and as a result the screen will be forced downwardly and will slip off the shoulder 4, so that the screen will be blown down into a cavity 8, disposed below the outlet passage 3. The current of air is then free to flow from the inlet passage 2 to the outlet passage 3, and although the air will not thereafter be strained, the flow of air will be maintained and thus any mechanism depending for its action on the flow of air through said passage will not be rendered inoperative.

Having now described my invention, what I claim as new and desire to secure by Letters Patent, is:—

1. A fluid strainer device comprising a section having a fluid inlet and a fluid outlet, a strainer normally disposed in the path of flow from the inlet to the outlet, and a chamber in said section on the outlet side of said strainer disposed out of the path of flow and into which said strainer is propelled in case the strainer becomes clogged with foreign matter.

2. A fluid strainer device comprising a section having a fluid inlet and a fluid outlet, an annular shoulder provided in said section between the fluid inlet and the fluid outlet, a strainer normally positioned on said shoulder and disposed in the path of flow of fluid from the inlet to the outlet, and a chamber disposed below the fluid outlet and out of the path of flow and into which said strainer propelled in the event that the strainer becomes clogged with foreign matter.

In testimony whereof I have hereunto set my hand.

CLYDE C. FARMER.